United States Patent
Griffin et al.

(10) Patent No.: US 12,086,579 B2
(45) Date of Patent: Sep. 10, 2024

(54) DERIVING A CONTAINER FROM A PACKAGE SET

(71) Applicant: Red Hat, Inc., Raleigh, NC (US)

(72) Inventors: Leigh Griffin, Waterford (IE); Pierre-Yves Chibon, Paris la Defense (FR)

(73) Assignee: Red Hat, Inc., Raleigh, NC (US)

(*) Notice: Subject to any disclaimer, the term of this patent is extended or adjusted under 35 U.S.C. 154(b) by 84 days.

(21) Appl. No.: 17/900,237

(22) Filed: Aug. 31, 2022

(65) Prior Publication Data

US 2024/0069883 A1    Feb. 29, 2024

(51) Int. Cl.
   *G06F 8/61*    (2018.01)
   *G06F 9/445*   (2018.01)

(52) U.S. Cl.
   CPC ............ *G06F 8/63* (2013.01); *G06F 9/44505* (2013.01)

(58) Field of Classification Search
   None
   See application file for complete search history.

(56) References Cited

U.S. PATENT DOCUMENTS

| | | |
|---|---|---|
| 7,519,814 B2 | 4/2009 | Rochette et al. |
| 8,533,661 B2 | 9/2013 | Nucci et al. |
| 8,661,428 B2 | 2/2014 | Clark |
| 10,838,788 B2 | 11/2020 | Caldato et al. |
| 10,929,117 B2* | 2/2021 | Goldmann .......... G06F 9/45558 |
| 11,093,221 B1* | 8/2021 | Novy .......... G06F 8/63 |
| 11,429,596 B2* | 8/2022 | Qi .......... G06F 16/2379 |
| 11,755,309 B2* | 9/2023 | Chibon .......... G06F 8/658 717/168 |
| 2020/0159536 A1 | 5/2020 | Saidi |
| 2020/0293354 A1* | 9/2020 | Song .......... G06F 8/71 |
| 2023/0244466 A1* | 8/2023 | Shah .......... H04L 67/34 717/178 |

FOREIGN PATENT DOCUMENTS

| | | |
|---|---|---|
| KR | 20080037450 A | 4/2008 |
| WO | 2019153829 A1 | 8/2019 |

OTHER PUBLICATIONS

Parziale, Lydia et al., "Getting started with z/OS Container Extensions and Docker," IBM Redbooks, https://www.redbooks.ibm.com/redbooks/pdfs/sg248457.pdf, Nov. 2019, 270 pages.

Author Unknown, "Lambda Deployment Packages," Amazon Web Services, https://docs.aws.amazon.com/lambda/latest/dg/gettingstarted-package.html, Aug. 2022, 4 pages.

* cited by examiner

*Primary Examiner* — Marina Lee

(74) *Attorney, Agent, or Firm* — Dority & Manning, P.A.

(57) ABSTRACT

Deriving a container from a package set is disclosed. Package set metadata that identifies a plurality of packages to be included in a container image based on a package set is accessed. A container configuration file referencing the plurality of packages is generated based at least in part on the package set metadata. The container configuration file includes one or more commands complying with a container builder syntax that are implementable by a container builder to generate a container image including the plurality of packages. The container configuration file is stored in a memory of a computer system.

19 Claims, 6 Drawing Sheets

US 12,086,579 B2

DERIVING A CONTAINER FROM A PACKAGE SET

TECHNICAL FIELD

The examples relate generally to building containers, and in particular to deriving a container from a package set.

BACKGROUND

Containerization technologies, such as Docker, are increasingly popular due in part to the relatively light-weight processing requirements of containers compared to other virtualization technologies, such as virtual machines. A container image is a stand-alone executable application that includes everything needed to run it, such as executables, system tools, system libraries, settings, and the like. Developers can create packages of software modules that provide for convenient, logical installation of related software files.

SUMMARY

The present disclosure provides a mechanism for capturing a package set with its underlying requirements, such as operating system and customizations, in a container configuration file. The container configuration file can describe all the aspects of the container environment necessary for its creation in an easily transferrable format. The container configuration file can be implemented by a container builder to build a container image in a computing environment.

In one example a method is provided. The method includes accessing, by a computer system comprising one or more computing devices, package set metadata that identifies a plurality of packages in a package set to be included in a container image. The method further includes generating, by the computer system, a container configuration file referencing the plurality of packages based at least in part on the package set metadata. The container configuration file includes one or more commands complying with a container builder syntax that are implementable by a container builder to generate a container image comprising the plurality of packages. The method further includes storing, by the computer system, the container configuration file in a memory of the computer system.

In another example a computer system is provided. The computer system includes one or more computing devices to access package set metadata that identifies a plurality of packages to be included in a container image based on a package set. The computing devices further generate a container configuration file. The container configuration file includes one or more commands complying with a container builder syntax that are implementable by a container builder to generate a container image comprising the plurality of packages. The computing devices further store the container configuration file in a memory of the computer system.

In another example a non-transitory computer-readable storage medium is provided. The storage medium includes executable instructions that cause one or more processor devices executing the instructions to access package set metadata that identifies a plurality of packages to be included in a container image based on a package set. The instructions further cause the one or more processor devices to generate a container configuration file. The container configuration file includes one or more commands complying with a container builder syntax that are implementable by a container builder to generate a container image comprising the plurality of packages. The instructions further cause the one or more processor devices to store the container configuration file in a memory of a computing system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
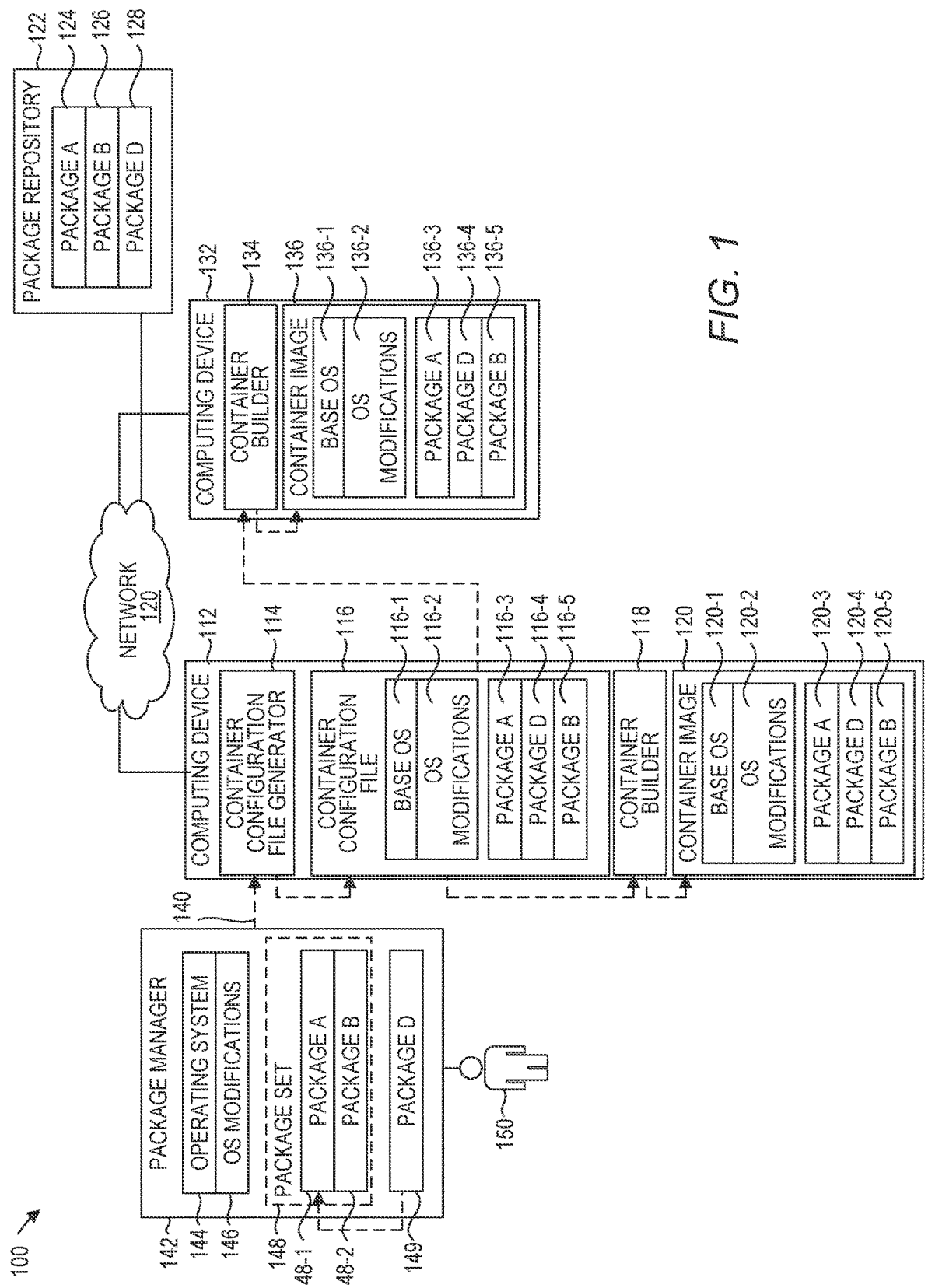
FIG. 1 is a block diagram of an environment for determining container configuration files from package sets according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Containers and containerizing orchestration tooling (e.g., Docker, Kubernetes, OpenShift, etc.) provide for powerful and convenient deployment and recreation of computing environments across one or more computing devices. A container can include software directed to some functionality along with necessary components (e.g., software packages, operating system modifications, etc.) necessary to implement that functionality. For instance, a container builder can implement commands, typically manually and/or from a container configuration file, to build the container in a given computing environment. The container provides for a modular and relatively isolated computing environment for the given functionality, which can be especially beneficial in deployments across multiple computing devices, such as in a cloud computing environment.

Packages provide a manner for installing and/or customizing service content within an operating system and/or container. A package can include and/or describe versions, customizations, etc. of software content. Packages can be managed by a package manager application, such as RPM package manager or other suitable package manager application. For instance, the package manager application can provide functionality for management, development, deployment, updating, distribution, and/or organization of packages.

In some package manager applications, packages can be tagged with labels to provide for the creation of a package set. The package set can be a set of (e.g., all) packages tagged with a given label associated with the package set. The package set can represent some logical grouping of packages, such as a system image, a set of packages that should be installed as a block, group, or unit (e.g., to implement some desired functionality), a set of versions of a given software module, and/or other logical groupings. However, a package set does not necessarily need to follow a logical grouping. Typically, a programmer or event handler will tag the packages in the package set with the associated labels. As one example, a developer may tag all packages necessary to run some software module (e.g., in a container) with a given package set label. As another example, packages present in a computing environment during some event (e.g., a fault or error, a timer, a backup event, etc.) can be tagged with a package set label indicating that the packages were present when the event was handled.

Although this approach is functional, there are difficulties associated with implementing package sets across large-scale distributions, such as across containers in cloud computing environments, or if the package components require updating. For instance, there is no known mechanism for deploying a specific package set to a container or ensuring that the package set is maintained or up to date. As one example, there is no convenient manner to create a container configuration file for a given package set. Furthermore, manually constructing a container from a package set can be both time-consuming and prone to wasted computing resources, such as redundant dependencies triggering multiple installs of the same or similar dependency packages, especially in cases of layered configuration files.

The present disclosure provides a mechanism for capturing a package set with its underlying requirements, such as operating system and customizations, in a container configuration file. Containerization technologies, such as Docker, utilize a container configuration file, such as a Dockerfile, to generate a container image. The container image is a stand-alone executable package that includes all the resources needed to run, such as executable(s), system tools, system libraries, settings, and the like.

The container configuration file can describe all the aspects of the container environment necessary for its creation in an easily transferrable format. The container configuration file can be formatted to follow a container builder syntax. For example, the container configuration file can describe, in commands that can be directly interpreted by a container builder, instructions for installing the container. The commands can describe, for example, a base operating system, modifications to that operating system, one or more packages to be installed in the container, an order in which the packages are to be installed, modifications (e.g., command line flags) for the packages at install, and/or other suitable instructions. Thus, the container configuration file can be implemented by a container builder to build a container image, even on a computing device separate from that which generated the container configuration file. In this way, a container environment can easily be deployed, maintained, and updated across distributions without substantial resource requirements. Furthermore, the container configuration file can be optimized to, for example, reduce duplicate dependencies to streamline the container's size while still satisfying the requirements of the package set.

Examples according to the present disclosure can provide a number of technical effects and benefits including improvements to computing technology. As one example, generation of container configuration files as described herein can provide for the reduction of duplicate or redundant dependencies in a package set that is used to instantiate a container. Duplicate dependencies can contribute to wasted computer resource usage in that, for example, memory resources can be wasted on storing duplicate dependencies, processing resources can be wasted on evaluating or running duplicate dependencies, and/or network resources can be wasted in downloading duplicate dependencies. Thus, because generation of container configuration files as described herein reduce or eliminate duplicate dependencies, a reduction in wasted computer resources is therefore achieved.

As another example, the present disclosure provides for increased availability of automatically-generated container configuration files. This, in turn, increases availability of updated package sets containing bug fixes, efficiency improvements, new functionality, etc., which is made more readily available to users of the software. Thus, the present disclosure provides for more reliable and/or efficient software to be distributed to users, therefore increasing the reliability and/or efficiency of computing systems that instantiate the container images described by the container configuration files.

FIG. 1 is a block diagram of an environment 100 for generating a container configuration file from a package set according to one example. The environment 100 includes a computing device 112 on which a container image 120 will be generated according to the examples disclosed herein. The environment 100 also includes a computing device 132 on which a container image 136 will be generated according to the examples disclosed herein. The container image 120 and the container image 136, as will be discussed in greater detail below, can be generated from container configuration file 116 which is in turn produced from a package set 148 in a package manager 142.

The environment 100 includes the package manager 142. The package manager 142 provides a collection of tools (e.g., software tools) for facilitating the development, installation, upgrading, transferring, distribution, and/or other management tasks of software packages. The package manager 142 can run and/or be run with an operating system (OS) 144. In some cases, the package manager 142 can have a plurality of operating systems 144 installed at a given time, and a developer 150 may switch between the plurality of operating systems 144 to develop in a given operating system environment. The package manager 142 can additionally be configured with one or more operating system modifications 146. The operating system modifications 146 can be customizations to the operating system that are implemented by a developer 150, such as, for example, an overclocked processor, a memory expansion, settings configurations, and/or any other suitable operating system modifications.

The package manager 142 can include a package set 148. The package set 148 is illustrated as including two packages, a package A 148-1 and a package B 148-2. It should be understood that the package set 148 can include any number of packages. The developer 150 and/or a system process (e.g., a timer) can tag each package to be included in a package set 148 with a label indicating that the package is included in the package set 148. For instance, the label may be metadata that is stored separately from and/or attached to an instance of the packages 148-1 and 148-2 in the package manager 142. Furthermore, in some instances, the package set 148 can be or can include a list of included packages. The packages 148-1 and/or 148-2 can have one or more dependencies that define packages on which the packages 148-1 and/or 148-2 depend. In the example environment 100, the package A 148-1 is dependent on a package D 149. The packages 148-1 and 148-2 with dependencies can require that the dependent packages be installed in a same environment (e.g., a same container) for successful operation of software implementing the packages 148-1 and 148-2.

Although the package manager 142 is illustrated as being separate from the computing devices 112 and 132, it should be understood that the package manager 142 can be implemented on any suitable computing device, including the computing devices 112 and/or 132 and/or one or more computing devices separate from computing devices 112 and 132. Moreover, in examples where the package manager 142 comprises software instructions that program the computing devices 112 and/or 132 to carry out functionality discussed herein, functionality implemented by the package manager 142 may be attributed herein to the computing devices 112 and/or 132.

The package set 148 can define a set of packages and dependencies, for the given operating system 144 with the given operating system modifications 146, that collectively provide a software module that is logically and/or functionally desirable to distribute and/or install as a unit. For instance, the package set may define a complete set of packages for implementing a functional container in the environment of the package manager 142. It can be desirable to distribute the package set 148 and the environment of the package manager 142 among a plurality of computing devices. As one example, it may be desirable to make a backup or version of the package set 148 with regard to the environment in which the package set 148 operates. The backup or version may provide for easier recovery of a functional version if future iterations of the package set have errors in functionality. As another example, it may be desirable to distribute a functional container from a first computing device (e.g., implementing the package manager 142) to another computing device. As one example, if the first computing device is computing device 112, it may be desirable to configure the computing device 132 to implement a same container as computing device 112.

Thus, a container configuration file generator 114 can generate a container configuration file 116. For instance, the container configuration file generator 114 can access package set metadata 140 (e.g., from package manager 142), such as the tags on packages in the package set 148, etc., that identifies a plurality of packages (e.g., 148-1, 148-2) in a package set (e.g., 148) to be included in a container image (e.g., 120, 136). The container configuration file 116 can reference the plurality of packages 148-1, 148-2 in package set 148. As an example, the container configuration file 116 can include one or more commands that instruct a container builder (e.g., 118, 134) to install and/or modify the packages in package set 148. For instance, the container configuration file 116 can comply with a container builder syntax such that the container configuration file is implementable by a container builder 118, 134 to generate a container image 120, 136 comprising the plurality of packages.

The container configuration file 116 can include one or more OS commands 116-1 that reference the base OS 144 in which the package set 148 was implemented. For instance, the OS commands 116-1 may be a first (or zeroth) layer of the container configuration file, such that the OS commands 116-1 are the first commands implemented by a container builder 118, 134 (e.g., after any standard initialization commands). As one example, the OS commands 116-1 can be a "FROM" line in a Dockerfile, such as a "FROM: linux v 5.2" command. The container builder 118 of computing device 112 can interpret the OS commands 116-1 to implement the base OS 120-1 in container image 120. For instance, the container builder 118 can access an operating system installation on the computing device 112 corresponding to the OS and version identified by the operating system commands 116-1 to instantiate the container image 120 with the base OS 120-1. Similarly, the container builder 134 of computing device 132 can implement the OS commands 116-1 to implement the base OS 136-1 in container image 136.

The OS commands 116-1 can have any desired degree of compatibility. As an example, the OS commands 116-1 may identify an exact version, sub-version, etc. of the operating system 144 that the container image 120, 136 must instantiate. As another example, the OS commands 116-1 may identify a version, sub-version, etc. and indicate that any version prior to or subsequent to the identified version is acceptable. As yet another example, the OS commands 116-1 may identify a range of acceptable versions. If, for example, a container builder does not have access to an installation of the specified (or compatible) operating system, the container builder may reject building the container image, download the specified operating system, or otherwise indicate that the specified or compatible operating system must be installed to implement the container image.

Additionally, the container configuration file 116 can include one or more OS modification commands 116-2. The container builder 118 can interpret the OS modification commands 116-2 to implement the OS modifications 120-2 in container image 120. Similarly, the container builder 134 can interpret the OS modifications commands 116-2 to implement the OS modifications 136-2 in the container image 136. As one example, the OS modification commands 116-2 can include commands to implement customizations to the base OS 120-1 or 136-1, such as, for example, overclocking, memory modifications, setting customizations, etc.

The container configuration file 116 can also include package installation commands 116-3, 116-4 and/or 116-5. The container builder 118 can interpret the package installation commands 116-3, 116-4 and/or 116-5 to install packages 120-3, 120-4, and 120-5 in container image 120. Similarly, the container builder 134 can interpret the package installation commands 116-3, 116-4 and/or 116-5 to install packages 136-3, 136-4, and 136-5 in container image 136. Note that the package installation commands include a package A installation command 116-3 and a package B installation command 116-5 from package A 148-1 and package B 148-2 being included in the package set 148. Additionally, the package installation commands include the package D installation command 116-4 even though package D 149 is not included in package set 148 because package A 148-1 has a dependency on package D 149. The examples described herein can determine an order of the package installation commands (e.g., 116-3, 116-4, 116-5) that accounts for duplicate dependencies and/or other optimizations in the installation order.

The container builder 118, 134 can download, retrieve, and/or otherwise obtain the packages identified in the container configuration file 116. For instance, in some implementations, the container builder can access (e.g., over network 120) a package repository 122 that stores the identified packages. For instance, when the container builder 118 interprets package A installation instruction 116-3, the computing device 112 can download the instance of package A 124 from the package repository 122. Similarly, the package repository 122 can store instances of package B 126 and/or package D 128. As one example, the package repository 122 can be a centralized package distribution service, such as GitHub or another suitable package repository. Although the package repository 122 is illustrated as being separate from computing device 112 (e.g., separated by network 120), the package repository can also be stored in memory internal to computing device 112. Furthermore, although package repository 122 is illustrated as storing each of package A 124, package B 126, and package D 128, some or all of the packages may be stored at separate package repositories.

Containerization technologies, such as, by way of non-limiting example, Docker container technology, Kubernetes container technology, CoreOS (Rocket) container technology, Tectonic container technology, and the like, are increasingly popular due, in part, to their relatively low resource requirements compared to other process isolation mechanisms, such as virtual machines. Entities that utilize container technologies often prefer that all processes executed in a computing environment be capable of being containerized and run as containers.

The container builders 118, 134 and/or container images 120, 136 may be or include any containerization technology or containerization technologies, such as, by way of non-limiting example, Open Shift, Docker, Kubernetes, or the like. In some applicable cases, the phrase "container" as used herein can refer to Linux containers wherein the Linux kernel features cgroups and namespaces are used to isolate processes from one another but may also be used to refer to any suitable container. In some implementations, for example, a container can be grouped with a plurality of other containers in a pod, such as a Kubernetes pod.

The phrase "container image" as used herein refers to a static package of software comprising one or more layers, the layers including everything needed to run an application (i.e., as a container) that corresponds to the container image, including, for example, one or more of executable runtime code, system tools, system libraries and configuration settings. A Docker® image is an example of a container image.

While for purposes of illustration only a few container images 120, 136 are illustrated, in operation, the environment 100 (e.g., computing device 112 and/or computing device 132) may have hundreds or thousands of containers executing at any given time. Similarly, while for purposes of illustration only a few computing devices 112, 132 are illustrated, in operation, the environment 100 may have hundreds or thousands of computing devices.

In some examples, the container environment 100 is implemented in a cloud computing system, such as, by way of non-limiting example, an Amazon Web Services (AWS) or Microsoft Azure cloud computing environment. The phrase "cloud computing system" or "cloud computing environment" refers to a system that provides automated on-demand self-service to multiple external entities (e.g., external computing devices) via an application programming interface (API) over a network to a shared pool of configurable computing devices used to implement requests from the external entities for computing resources, such as data storage, application execution, and database management computing resources. The examples have applicability in, among other environments, any type of cloud computing environment, such as, by way of non-limiting example, public, private, and/or hybrid cloud computing environments implemented, for example, by Red Hat® OpenStack, Oracle® Cloud, Amazon® Web Services, Google® Cloud, Microsoft® Azure, IBM® cloud services, Salesforce.com®, and the like. For instance, the examples can be useful in distributing identical container images across several computing devices comprising a cloud computing environment with reduced manpower and/or computing resource requirements.

Figure 2:
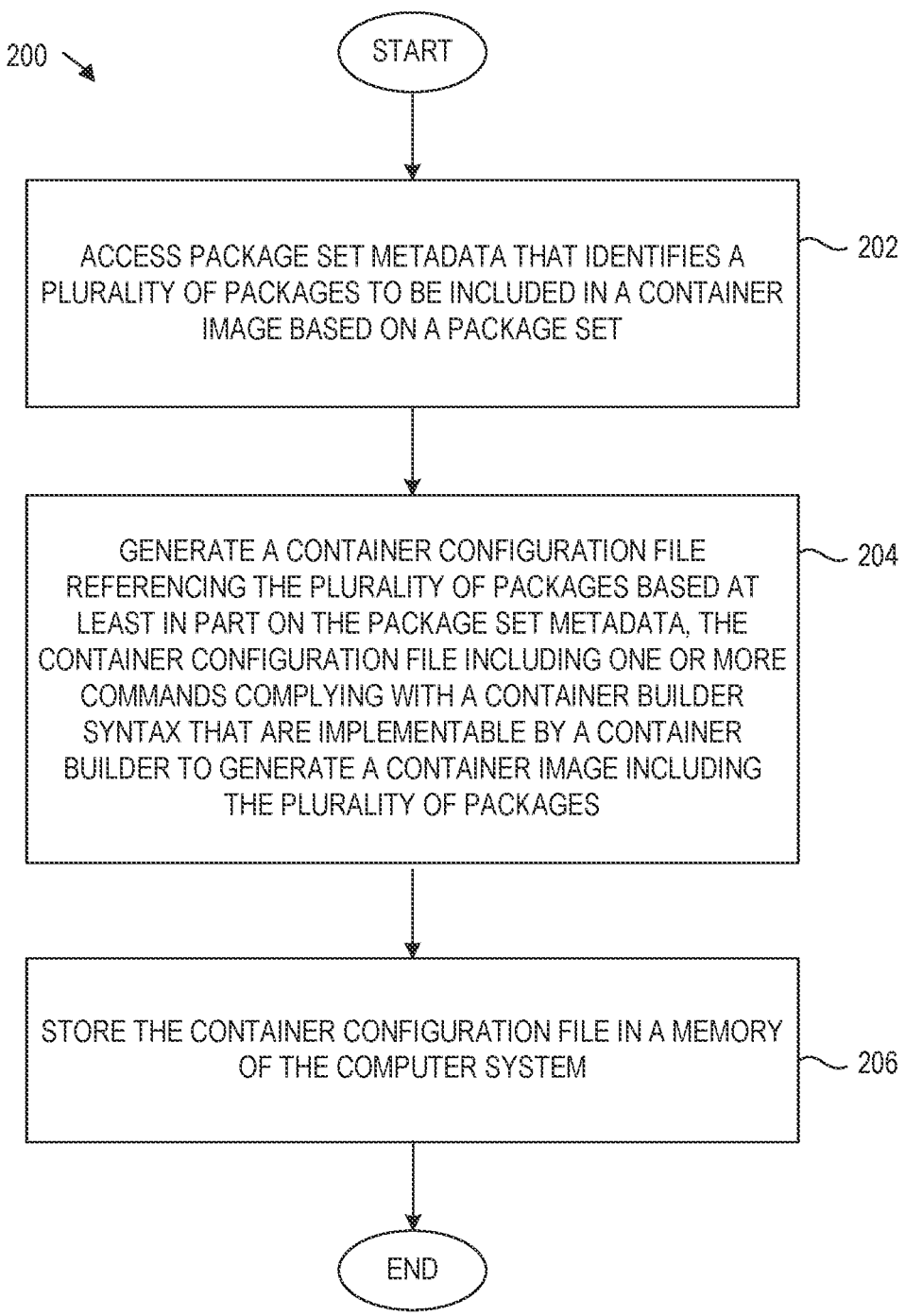
FIG. 2 is a flowchart of a method for container image building from package sets according to one example.

FIG. 2 is a flowchart of a method 200 for container image building from package sets according to one example. The method 200 can be implemented by any suitable computer system, such as the computing environment 100 of FIG. 1.

The method 200 includes, at 202, accessing (e.g., by a computer system including one or more computing devices) package set metadata that identifies a plurality of packages in a package set to be included in a container image. The package set metadata can be accessed from any suitable computer system, memory, etc., such as a package manager application. In some implementations, the package set metadata can be a list identifying the plurality of packages in the package set. The list can include, for example, a name of the package set, a name (e.g., filename) of each of the package(s), and/or other identification information for the packages.

As another example, in some implementations, the package set metadata includes tag metadata associated with the plurality of packages, wherein each package of the plurality of packages is tagged with a label of the package set metadata identifying that the package is included in the package set. For instance, the package set metadata can include a collection of labels that tag the plurality of packages as being included in the package set. A package can be tagged with the package set metadata including a label that indicates which package set(s) the package belongs to. A developer in a package manager and/or an event listener can tag the package with the package set metadata.

Furthermore, in some implementations, the package set metadata can include information descriptive of an environment in which the package set was created, is intended to run, etc. As one example, the package set metadata can identify a base operating system for the software packages in the package set. For example, the packages may have been developed to run on the base operating system identified by the package set metadata. As another example, the package set metadata can identify any modifications or customizations made to the operating system in the environment where the package set is intended to run. For instance, the package set metadata may identify modifications such as processor overclocking, settings, memory modifications, etc.

The method 200 includes, at 204, generating (e.g., by the computer system) a container configuration file referencing the plurality of packages based at least in part on the package set metadata. The container configuration file includes one or more commands complying with a container builder syntax that are implementable by a container builder to generate a container image including the plurality of packages. The container configuration file can be any suitable file that is interpretable and/or implementable by any suitable container builder, such as, for example, a Dockerfile implementable by Docker container technology.

In some implementations, the container configuration file can include a plurality of layers descriptive of a functional grouping of the plurality of packages in the container image. Generating the container configuration file can include assigning each of the plurality of packages to one of the plurality of layers. For instance, each layer of the plurality of layers may identify a package or set of packages that implement some desired functionality as part of the larger package set. For instance, in some cases, each command in the container configuration file can be a layer. In some cases, one or more commands may be grouped into a single layer. Layered container images (and container configuration files) can present challenges for package dependencies. For instance, if a first package in a first layer has a dependency and a second package in a second layer has the same dependency, the dependency may be installed twice if the first and second layers are not ordered in such a way that the second package can recognize that the dependency is already installed.

The container configuration file can additionally identify package customizations associated with the plurality of packages. The package customizations can be customizations to installation and/or operation of the packages that are specified for the package set. As one example, the package customizations may include command-line flags, runtime options, or other package customizations. During generation of the container configuration file, a computer system can access package customization metadata that identifies one or more package customizations associated with the plurality of packages to be included in the container image. For instance, the computer system can access the package customization metadata from a package manager or other development environment. The container configuration file can be generated such that the container configuration file further identifies the one or more package customizations associated with the plurality of packages. For instance, package commands that instruct a container builder to install packages can be generated in accordance with the package customizations.

In some implementations, generating the container configuration file comprises can include identifying one or more dependencies of the plurality of packages and performing combinatorial analysis of the one or more dependencies of the plurality of packages to remove duplicate dependencies among the plurality of packages such that the duplicate dependencies are not included in the container configuration file. For instance, suppose that a first package, Package A, includes a dependency on a third package, Package D. Suppose that a second package, Package B, also depends on the third package. If Package A and Package B are included in a package set that is used to generate a container configuration file, it should not be necessary to install Package D twice. However, in some cases, such as if Package A is included in a different layer from Package B, an unintelligent analysis of the dependencies may cause the dependent package to be installed twice. However, combinatorial analysis can be used to determine how best to include the packages in the container configuration file to reduce or eliminate duplicate dependences.

As one example, generating the container configuration file can include ordering the plurality of packages in the container configuration file based at least in part on the combinatorial analysis of the one or more dependencies. For instance, if a first package is dependent on a third package and a second package is dependent on the third package, the third package may be installed at an earlier layer than the first and second packages such that both packages can recognize the third package during their respective installations.

In some implementations, generating the container configuration file includes determining, by the computer system, a base operating system associated with the package set and generating, by the computer system, a base operating system command referencing the base operating system in the container configuration file. For instance, the base operating system command can instruct a container builder to fetch and/or install the base operating system. In some cases, the base operating system command can be a base layer of the container configuration file. For instance, the base operating system command can be an initial command of the container configuration file.

Furthermore, in some implementations, generating the container configuration file can include determining, by the computer system, one or more operating system customizations associated with the package set and generating, by the computer system, an operating system customization command referencing the one or more operating system customizations in the container configuration file. For instance, the operating system customization command can instruct the container builder to modify the base operating system in a way that mirrors an operating system modification or customization made at the environment where the container configuration file was generated. In some implementations, the operating system customization command can be a second layer of the container configuration file. For instance, the operating system customization command (or commands) can follow the base operating system command. Commands to install or modify packages can then follow the operating system customization command(s).

The method 200 includes, at 206, storing, by the computer system, the container configuration file in a memory of the computer system. Once the container configuration file has been generated, the file can be stored in, for example, a hard drive, solid state drive, cloud storage, or other suitable non-transitory, computer-readable medium. As one example, if the container configuration file is a Dockerfile, the container configuration file may be stored such that a Docker container builder can later read the container configuration file to generate the container image.

In some implementations, the computer system can further include transmitting, by the computer system, the container configuration file from a first computing device to a second computing device. For instance, it may be desirable to build the container configuration file from a package set on a first computing device and use the container configuration file to build a container image based on a container at the first computing system which was used to generate the package set and/or container configuration file. The present disclosure provides for a manner of easily and reliably reconstructing container images from images on a separate computing device.

The container configuration file can be used to update an existing container distribution on a computer system. For instance, a computer system can receive an updated container configuration file. The updated container configuration file can be an updated version of a container configuration file that was previously used to instantiate a container image on the computer system. For instance, in some implementations, a computer system can receive an updated container configuration file and update, by the computer system, one or more of the plurality of packages in the container image based at least in part on the updated container configuration file.

Once the container configuration file has been generated, a computing system can implement the container configuration file to generate the container image on the computer system. For instance, the commands that are interpretable by a container builder can be the container configuration file can be implemented by the container builder to build the container image, even on a computing device separate from that which generated the container configuration file. In this way, a container environment can easily be deployed, maintained, and updated across distributions without substantial resource requirements. Furthermore, the container configuration file can be optimized to, for example, reduce duplicate dependencies to streamline the container's size while still satisfying the requirements of the package set. Once the container image has been generated, the computer system can instantiate the container image to operate a container based at least in part on the container image.

In some implementations, the package set can be generated and/or updated in response to some package set update event within a computing environment. For instance, prior to first accessing the package set metadata, a computer system can determine that a package set update event has occurred. In response to determining that the package set update event has occurred, the computer system can access the package set metadata that identifies the plurality of packages to be included in the container, generate the container configuration file, and store and/or transmit the container configuration file.

Figure 3:
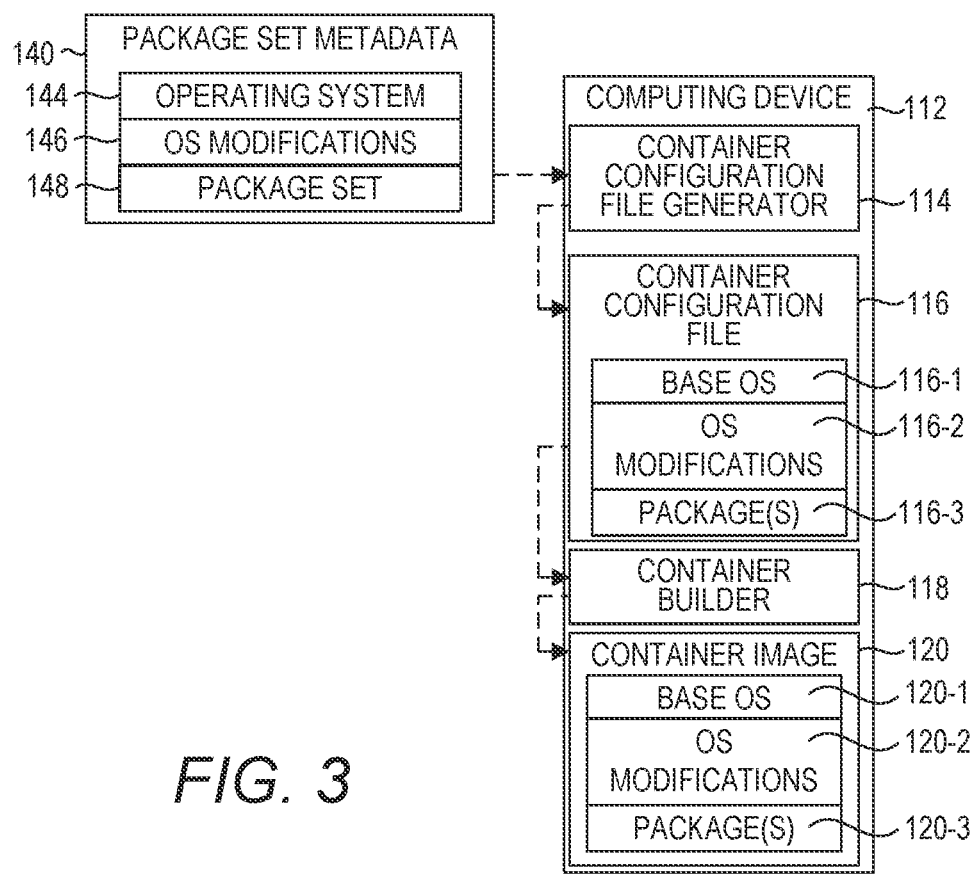
FIG. 3 is a block diagram of an environment for determining container configuration files from package sets according to one example.

FIG. 3 is a block diagram of an environment 300 for determining container configuration files from package sets according to one example. The environment 300 includes a computing device 112 on which a container image 120 will be generated according to the examples disclosed herein. A container configuration file generator 114 at computing device 112 can generate a container configuration file 116. For instance, the container configuration file generator 114 can access package set metadata 140 that identifies a base operating system 144, one or more operating system modifications 146, and/or a plurality of packages in a package set 148 to be included in container image 120. The container configuration file 116, once generated, can include one or more commands that comply with a container builder syntax, such as a base operating system command 116-1, operating system modification command(s) 116-2, and/or package installation command(s) 116-3.

The container builder 118 can interpret the commands in container configuration file 116 to build container image 120. For instance, the container builder 118 of computing device 112 can interpret the OS commands 116-1 to implement the base OS 120-1 in container image 120. As one example, the container builder 118 can access an operating system installation on the computing device 112 corresponding to the OS and version identified by the operating system commands 116-1 to instantiate the container image 120 with the base OS 120-1. Additionally and/or alternatively, the container builder 118 can interpret the OS modification commands 116-2 to implement the OS modifications 120-2 in container image 120. Additionally and/or alternatively, the container builder 118 can interpret the package installation commands 116-3 to install packages 120-3 corresponding to package set 148 in container image 120.

Figure 4:
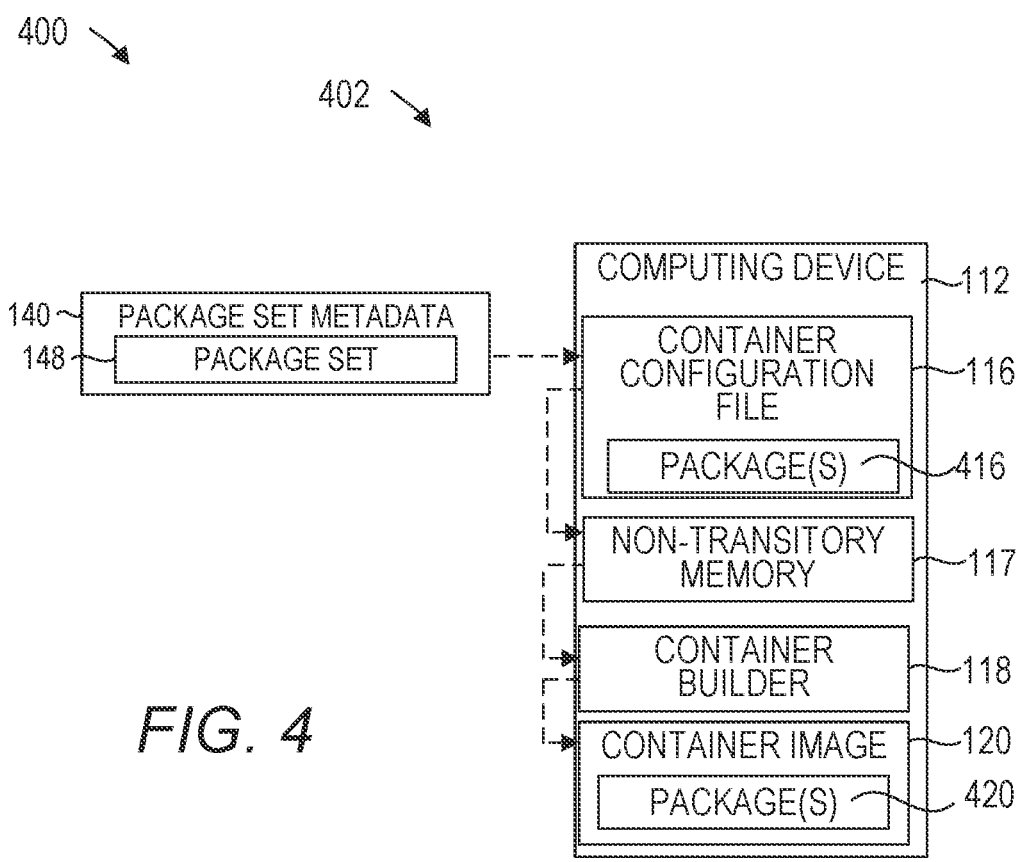
FIG. 4 is a block diagram of an environment for determining container configuration files from package sets according to one example.

FIG. 4 is a simplified block diagram of an environment 400 for determining container configuration files from package sets according to one example. The environment 400 includes a computer system 402 that includes one or more computing devices 112 to access the package set metadata 140 that identifies a plurality of packages 416, 420 to be included in the container image based on a package set. The one or more computing devices 112 are to generate the container configuration file 116 referencing the plurality of packages 416, 420 based at least in part on the package set metadata 140, the container configuration file 116 comprising one or more commands complying with a container builder syntax that are implementable by the container builder 118 to generate the container image 120 comprising the plurality of packages 416, 420. The one or more computing devices 112 are further to store the container configuration file 116 in the memory 117 of the computer system 402.

Figure 5:
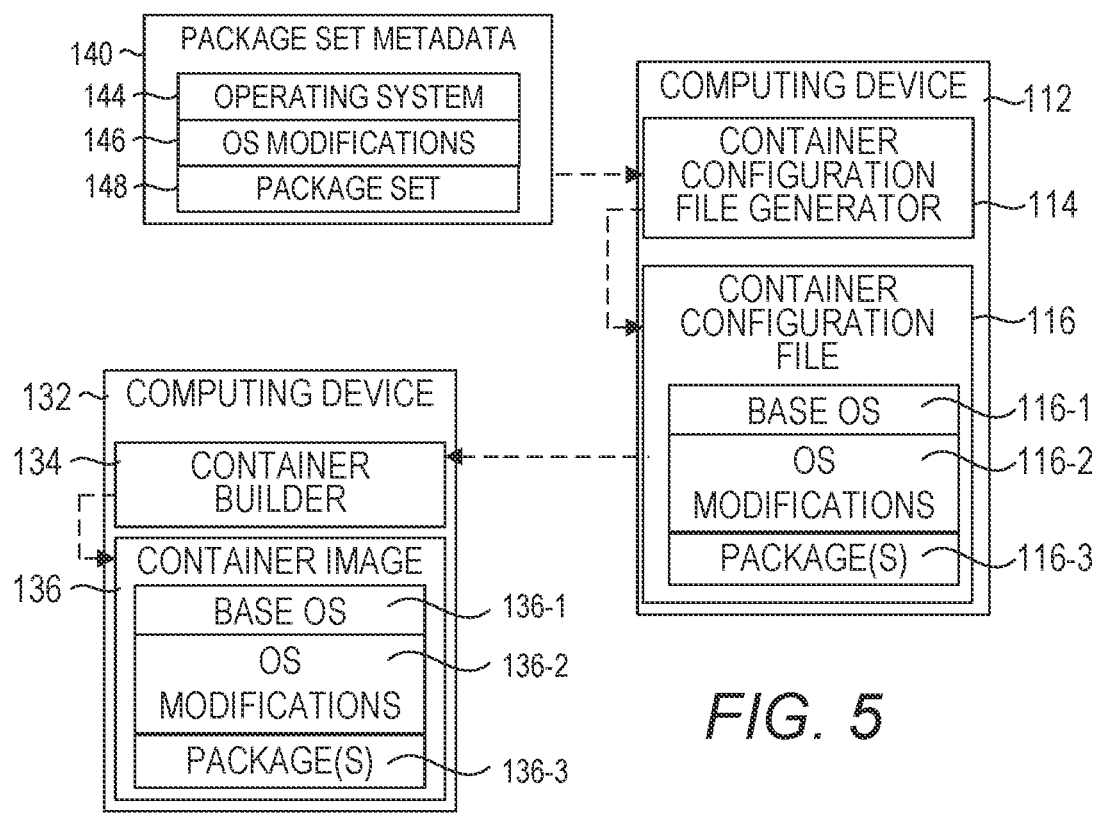
FIG. 5 is a block diagram of an environment for determining container configuration files from package sets according to one example.

FIG. 5 is a block diagram of an environment 500 for determining container configuration files from package sets according to one example. The environment 500 can include a container configuration file generator 114 configured to generate a container configuration file 116 from package set metadata 140, as described with respect to FIGS. 1 and 3. In the example of FIG. 4, a second computing device 132 can receive the container configuration file 116 from the first computing device 112. A container builder 134 at second computing device can then build container image 136 from the container configuration file 116. For instance, the container builder 134 can interpret the commands in container configuration file 116 to build container image 136. For instance, the container builder 134 of computing device 112 can interpret the OS commands 116-1 to implement the base OS 136-1 in container image 136. As one example, the container builder 134 can access an operating system installation on the computing device 112 corresponding to the OS and version identified by the operating system commands 116-1 to instantiate the container image 136 with the base OS 136-1. Additionally and/or alternatively, the container builder 134 can interpret the OS modification commands 116-2 to implement the OS modifications 136-2 in container image 136. Additionally and/or alternatively, the container builder 134 can interpret the package installation commands 116-3 to install packages 136-3 corresponding to package set 148 in container image 136.

As one example, the container configuration file 116 can be used to distribute a container from computing system 112 to the computing system 132. For instance, the container may be run in a cloud computing environment, which can require that the container be distributed to a large number of separate computing devices that collectively perform processing tasks as an entity. As another example, the container configuration file 116 may comprise a distribution of software for download, installation, etc. to provide for a user of the container to run a program or application using the container. The container configuration file 116 could thus be used to update or install the container across many computing devices (e.g., for many users).

Figure 6:
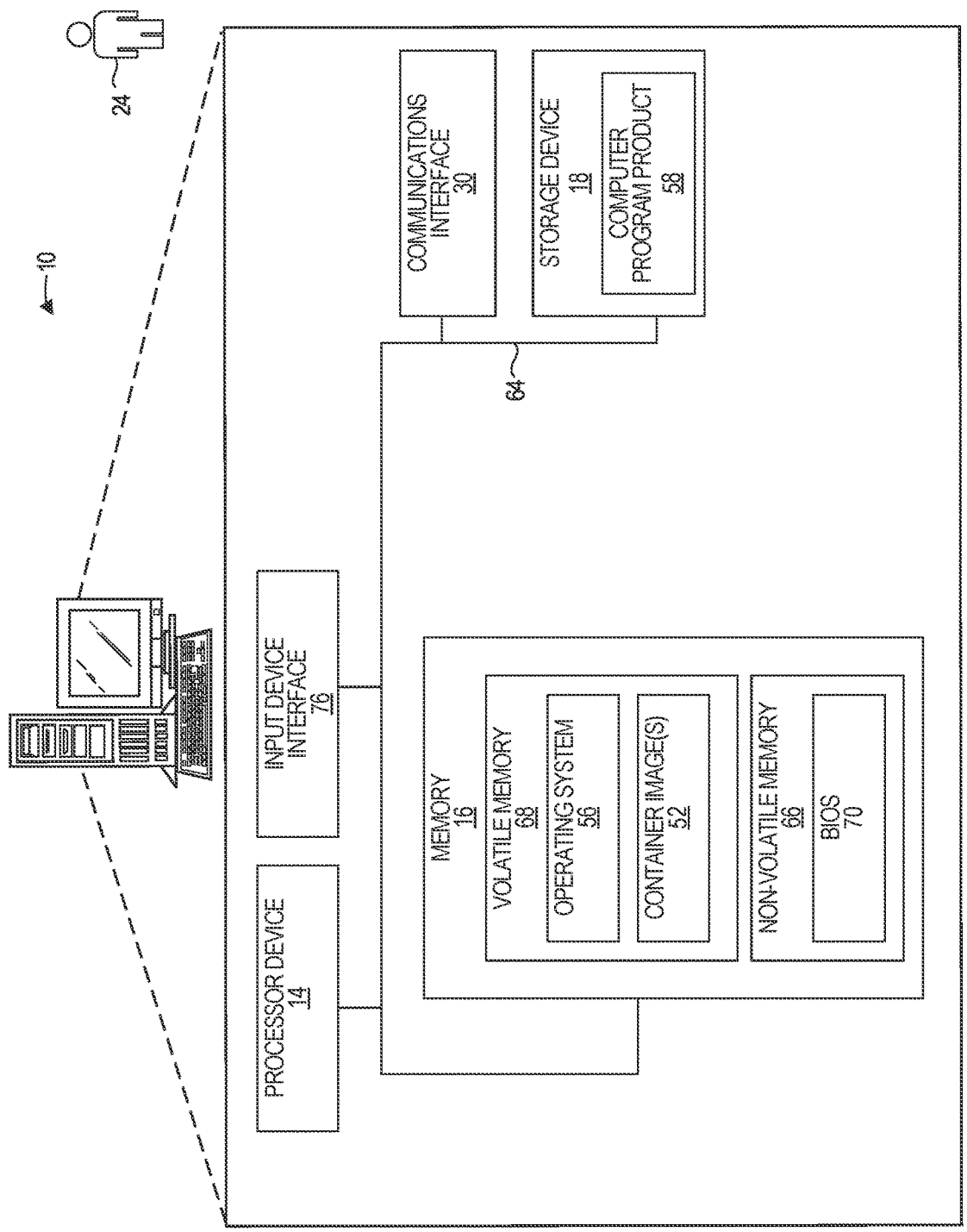
FIG. 6 is a block diagram of a computing device suitable for implementing examples disclosed herein.

FIG. 6 is a block diagram of the source computing device 10 suitable for implementing examples according to one example. The source computing device 10 may comprise any computing or electronic device capable of including firmware, hardware, and/or executing software instructions to implement the functionality described herein, such as a computer server, a desktop computing device, a laptop computing device, a smartphone, a computing tablet, or the like. The source computing device 10 includes the processor device 14, the system memory 16, and a system bus 64. The system bus 64 provides an interface for system components including, but not limited to, the system memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)).

A basic input/output system (BIOS) 70 may be stored in the non-volatile memory 66 and can include the basic routines that help to transfer information between elements within the source computing device 10. The volatile memory 68 may also include a high-speed RAM, such as static RAM, for caching data.

The source computing device 10 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like.

A number of modules can be stored in the storage device 18 and in the volatile memory 68, including an operating system 56 and one or more program modules, such as the container image(s) 52, which may implement the functionality described herein in whole or in part. All or a portion of the examples may be implemented as a computer program product 58 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14 may serve as a controller, or control system, for the source computing device 10 that is to implement the functionality described herein.

An operator, such as the user 24, may also be able to enter one or more configuration commands through a keyboard (not illustrated), a pointing device such as a mouse (not illustrated), or a touch-sensitive surface such as a display device. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The source computing device 10 may also include the communications interface 20 suitable for communicating with a network as appropriate or desired. The source computing device 10 may also include a video port configured to interface with a display device to provide information to the user 24.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by a computer system comprising one or more computing devices, package set metadata that identifies a plurality of packages in a package set to be included in a container image, wherein the package set metadata comprises tag metadata associated with the plurality of packages, wherein each package of the plurality of packages is tagged with a label of the package set metadata identifying that the package is included in the package set;
   generating, by the computer system, a container configuration file referencing the plurality of packages based at least in part on the package set metadata, the container configuration file comprising one or more commands complying with a container builder syntax that are implementable by a container builder to generate the container image comprising the plurality of packages; and
   storing, by the computer system, the container configuration file in a memory of the computer system.

2. The method of claim 1, wherein generating the container configuration file comprises:
   identifying one or more dependencies of the plurality of packages;
   performing combinatorial analysis of the one or more dependencies of the plurality of packages to remove duplicate dependencies among the plurality of packages, wherein the duplicate dependencies are not included in the container configuration file; and
   ordering the plurality of packages in the container configuration file based at least in part on the combinatorial analysis of the one or more dependencies.

3. The method of claim 1, wherein the container configuration file comprises a plurality of layers descriptive of a functional grouping of the plurality of packages in the container image, and wherein generating the container configuration file comprises assigning each of the plurality of packages to one of the plurality of layers.

4. The method of claim 1, wherein generating the container configuration file comprises:
   determining, by the computer system, a base operating system associated with the package set; and
   generating, by the computer system, a base operating system command referencing the base operating system in the container configuration file.

5. The method of claim 4, wherein the base operating system command comprises a base layer of the container configuration file.

6. The method of claim 1, wherein generating the container configuration file comprises:
   determining, by the computer system, one or more operating system customizations associated with the package set; and
   generating, by the computer system, an operating system customization command referencing the one or more operating system customizations in the container configuration file.

7. The method of claim 6, wherein the operating system customization command comprises a second layer of the container configuration file.

8. The method of claim 1, further comprising:
transmitting, by the computer system, the container configuration file from a first computing device to a second computing device.

9. The method of claim 1, further comprising:
receiving, by the computer system, an updated container configuration file; and
updating, by the computer system, one or more of the plurality of packages in the container image based at least in part on the updated container configuration file.

10. The method of claim 1, further comprising:
implementing, by the computer system, the container configuration file to generate the container image on the computer system; and
instantiating, by the computer system, the container image to operate a container based at least in part on the container image.

11. The method of claim 1, wherein the container configuration file is a dockerfile.

12. The method of claim 1, wherein the method further comprises, prior to accessing the package set metadata, determining, by the computer system, that a package set update event has occurred; and, in response to determining that the package set update event has occurred, accessing the package set metadata that identifies the plurality of packages to be included in the container image.

13. The method of claim 1, further comprising:
accessing, by the computer system, package customization metadata that identifies one or more package customizations associated with the plurality of packages to be included in the container image;
wherein the container configuration file further identifies the one or more package customizations associated with the plurality of packages.

14. A computing system comprising:
one or more computing devices to:
access package set metadata that identifies a plurality of packages in a package set to be included in a container image, wherein the package set metadata comprises tag metadata associated with the plurality of packages, wherein each package of the plurality of packages is tagged with a label of the package set metadata identifying that the package is included in the package set;
generate a container configuration file referencing the plurality of packages based at least in part on the package set metadata, the container configuration file comprising one or more commands complying with a container builder syntax that are implementable by a container builder to generate the container image comprising the plurality of packages; and
store the container configuration file in a memory of the computing system.

15. The computing system of claim 14, wherein generating the container configuration file comprises:

identifying one or more dependencies of the plurality of packages;
performing combinatorial analysis of the one or more dependencies of the plurality of packages to remove duplicate dependencies among the plurality of packages, wherein the duplicate dependencies are not included in the container configuration file; and
ordering the plurality of packages in the container configuration file based at least in part on the combinatorial analysis of the one or more dependencies.

16. The computing system of claim 14, wherein generating the container configuration file comprises:
determining a base operating system associated with the package set; and
generating a base operating system command that reproducibly identifies the base operating system in the container configuration file.

17. The computing system of claim 14, wherein generating the container configuration file comprises:
determining, by the computing system, one or more operating system customizations associated with the package set; and
generating, by the computing system, an operating system customization command that reproducibly identifies the one or more operating system customizations in the container configuration file.

18. A non-transitory computer-readable storage medium that includes executable instructions to cause one or more processor devices to:
access package set metadata that identifies a plurality of packages in a package set to be included in a container image, wherein the package set metadata comprises tag metadata associated with the plurality of packages, wherein each package of the plurality of packages is tagged with a label of the package set metadata identifying that the package is included in the package set;
generate a container configuration file referencing the plurality of packages based at least in part on the package set metadata, the container configuration file comprising one or more commands complying with a container builder syntax that are implementable by a container builder to generate the container image comprising the plurality of packages; and
store the container configuration file in a memory of a computing system.

19. The non-transitory computer-readable storage medium of claim 18, wherein generating the container configuration file comprises:
identifying one or more dependencies of the plurality of packages;
performing combinatorial analysis of the one or more dependencies of the plurality of packages to remove duplicate dependencies among the plurality of packages, wherein the duplicate dependencies are not included in the container configuration file; and
ordering the plurality of packages in the container configuration file based at least in part on the combinatorial analysis of the one or more dependencies.

* * * * *